NOISE GENERATOR

Filed Feb. 10, 1964 2 Sheets-Sheet 1

DON B. CLARK
RALPH E. BROWN
INVENTORS

BY Delmar H. Jansen
AGENT

Jan. 4, 1966 D. B. CLARK ETAL 3,227,964

NOISE GENERATOR

Filed Feb. 10, 1964 2 Sheets-Sheet 2

DON B. CLARK
RALPH E. BROWN
INVENTORS

BY Delmar H. Larsen

AGENT

United States Patent Office 3,227,964

Patented Jan. 4, 1966

3,227,964

NOISE GENERATOR

Don B. Clark, Ventura, Calif. (℅ Naval Civil Engineering Lab., Port Hueneme, Calif.), and Ralph E. Brown, Los Angeles, Calif. (℅ Genisco Inc., 18435 Susana Road, Compton, Calif.)

Filed Feb. 10, 1964, Ser. No. 343,800

8 Claims. (Cl. 331—78)

This invention relates to electrical noise generators, and more particularly, to an electro-mechanical device producing a wide noise spectrum by spark discharge means.

An important need exists for sources of electrical noise which may be used for the testing and calibration of various types of apparatus, such as radar components. Various noise generators are available commercially, and others have been described in the literature. Good discussions are found in the book by D. A. Bell, entitled "Electrical Noise," London: 1960, chapter 14 of which in particular discusses noise generators and the disadvantages of various types used; chapter 8 of the book by F. E. Terman and J. M. Pettit, entitled "Electronic Measurements," second edition, New York: 1952; and the Proceedings of a Conference on Noise in Electronic Devices, held October 2 and 3, 1959 at Baldock, Hertfordshire, under the auspices of and published by the Institute of Physics, London, 1961.

In spite of much work in this field, none of the previously known electrical noise generators is ideal. For example, those which utilize a pulsed resonant line discharge suffer from low power output over the flat spectrum region. Noise diodes exhibit a flicker effect at low frequencies and a shunting effect at higher frequencies resulting from tube capacitance. Gaseous discharge tubes are often used at microwave frequencies, for example, where waveguide applications are involved, but are very low in noise power output and especially are not applicable as calibration sources at low frequencies. Photomultiplier tubes may be used, but require a highly stabilized power supply and do not produce a flat spectrum of noise. Moreover, any device which gives an exceedingly lower power output over any or all regions of the noise spectrum and which accordingly must be used in connection with an amplifier for general use is inherently unstable because of the complications introduced by the necessary use of the amplifier.

An object of the invention is to provide a rugged mechanically and electrically uncomplicated electrical noise generator having a wide, flat spectrum from D.C. to at least 1000 megacycles per second and with a substantial power output over the entire spectrum, so that the use of an intermediate amplifier is unnecessary.

Other objects of the invention will appear as the description thereof proceeds.

In the drawings, FIGURE 1 is a side view, partially in section, showing an illustrative embodiment of our noise generator.

Figure 1:
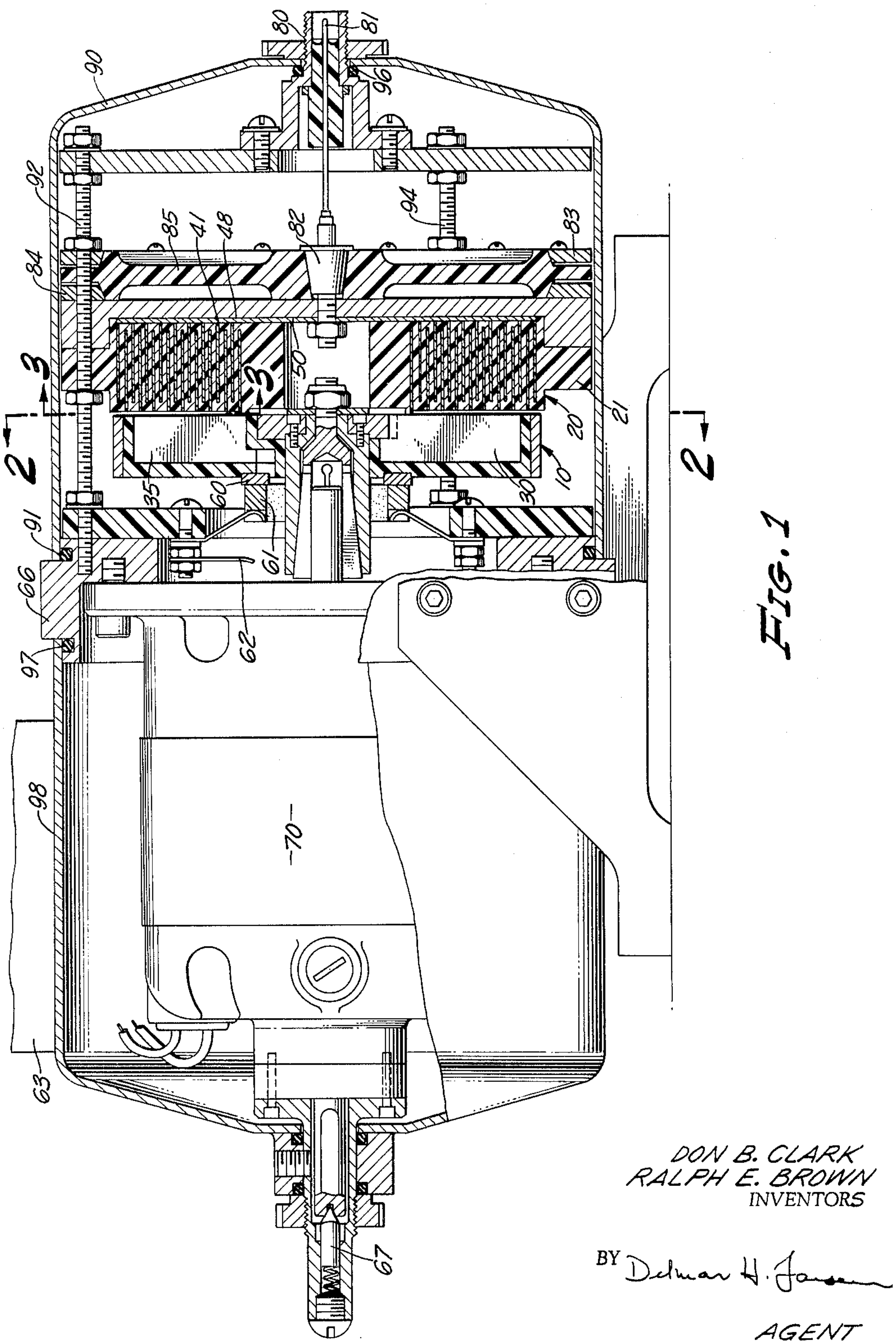

Generally speaking, we place in close juxtaposition two disc-like members which are co-axial and which are capable of rotation, one with respect to the other, one of which consists of a very large number of capacitors in a suitable insulating rotor, or stator, as the case may be, and the other of which consists of a means of repetitively and alternatively charging and discharging the said capacitors, all in accordance with the further description which follows.

In the illustrative embodiment shown in the drawings, and to be described hereinbelow, the disc-like member which performs the function of electrically charging and discharging the capacitor is the rotor, and more particularly is shown in the figures as 10. The circular disc-like assembly of the capacitor is a stator member and is shown as 20 in the drawings.

Figures 4, 5:
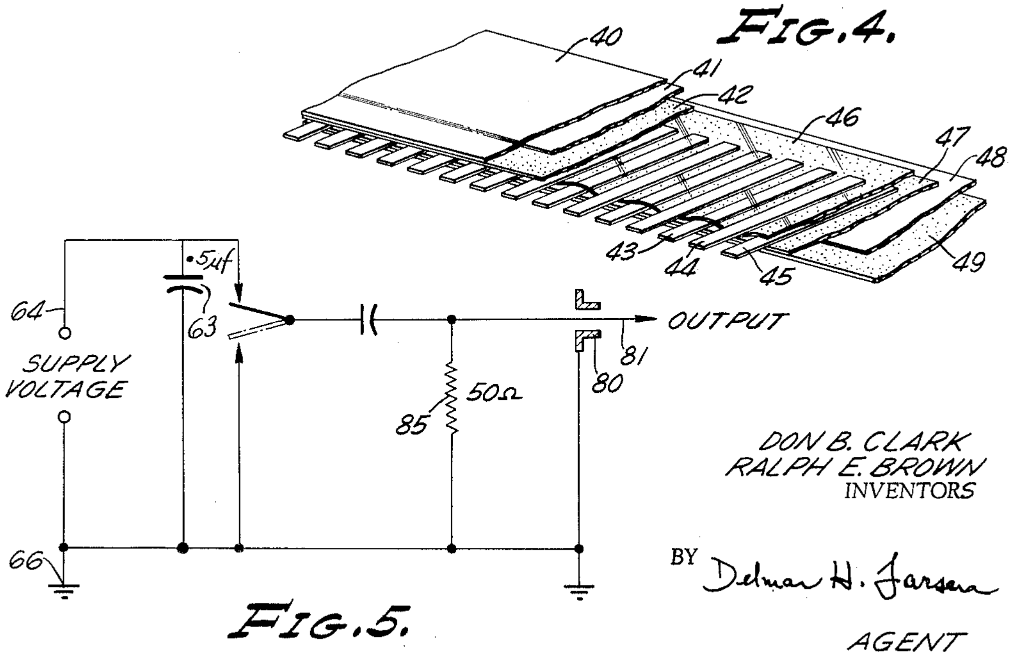
FIGURE 4 is a fragmentary, perspective view showing a portion of the steel strips embedded in the plastic which comprise a portion of the stator shown in FIGURE 3, prior to their being embedded therein.
FIGURE 5 is a schematic wiring diagram of the noise generator of FIGURE 1.

The detailed description of our exemplary and inventive noise generator as shown in the drawings may well begin with a discussion of the stator member 20, and of the matter of construction thereof. Referring first to FIGURE 4, this shows a fragment of a composite strip which is made up, in subsequent layers, of an insulating tape 40; a strip of copper 41; a second insulating tape 42; a succession of metal strips, of which we prefer spring steel 43, 44, 45, etc., through which is threaded in alternation a third insulating tape 46; a fourth insulating tape 47; a second copper strip 48; and finally a fifth insulating tape 49. For convenience in assembly, all of these components are preferably put together in a long strip using a suitable adhesive. The insulating tape which we find best is polyethylene oxide terephthalate, available commercially under the trade name Mylar. Any adhesive which gives a good bond between metal and whatever insulating tape is used is suitable, and of course it should have favorable electrical properties. Epoxy, phenol-formaldehyde, polyester, and furane adhesives are all commercially available in suitable formulations, and may be used. Of course, other insulators and other metals may be substituted. A polytetrafluoroethylene tape may be used, although it is considerably more expensive. Other metals may be substituted for the copper strip, such as brass, aluminum, and the like, but we prefer copper for its good electrical conductivity and ease of winding. Again, other metals may be used for the spring steel strips 43, 44, 45, such as stainless steel, platinum and the like, although we have found ordinary blued spring steel to be best from a practical standpoint.

Figure 3:
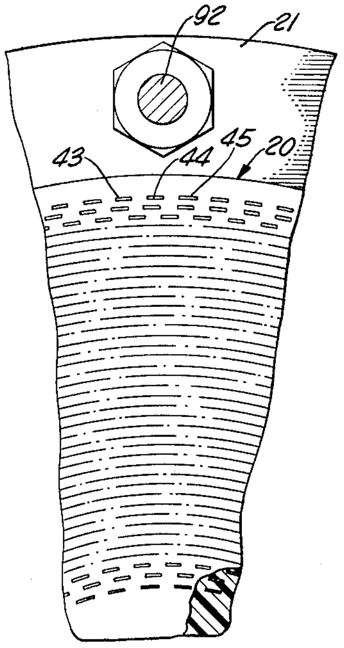
FIGURE 3 is a fragmentary end view, partially in section, of the stator of the noise generator, taken as shown by the arrow in FIGURE 1.

Having prepared a composite strip of sufficient length, we then wind the strip in a tight spiral as indicated by the drawings, and thereafter embed the spiral so formed in a matrix of suitable insulating compound, for which any of the epoxy potting compounds used for potting electrical compounds are suitable. Among the conventional potting techniques, it is desirable to use one employing a vacuum, so that subsequent to potting, the spiral presents a solid mass without air voids. Both sides of the potted spiral assembly are ground flat, and a central core and an outer rim 21 are turned from the potted assembly to facilitate mounting. Grinding as described exposes the ends of the spring steel strips 43, 44 and 45 on one side of the disc, which may be particularly clearly seen in FIGURE 3. The grinding of the other side of the disc exposes the edges of the copper strips 41 and 48, and these exposed edges are bonded to a metal disc 50 by conventional electro-plating and soldering techniques.

It will thus be seen that the stator member 20 presents a vast number of individual capacitors, which in an actual instance where the outer diameter of the stator 20 exclusive of the rim 21 was 5 inches, and the remainder of the apparatus to the scale shown in the drawings, and where the width and thickness of the individual spring steel elements were 0.060 inch and 0.003 inch, respectively, and where the thickness of the copper strips 42 and 48 and of the plastic insulating tape 40, 42, 46, 47, and 49, were each 0.005 inch, the total number of capacitors amounted to about 5000.

Figure 2:
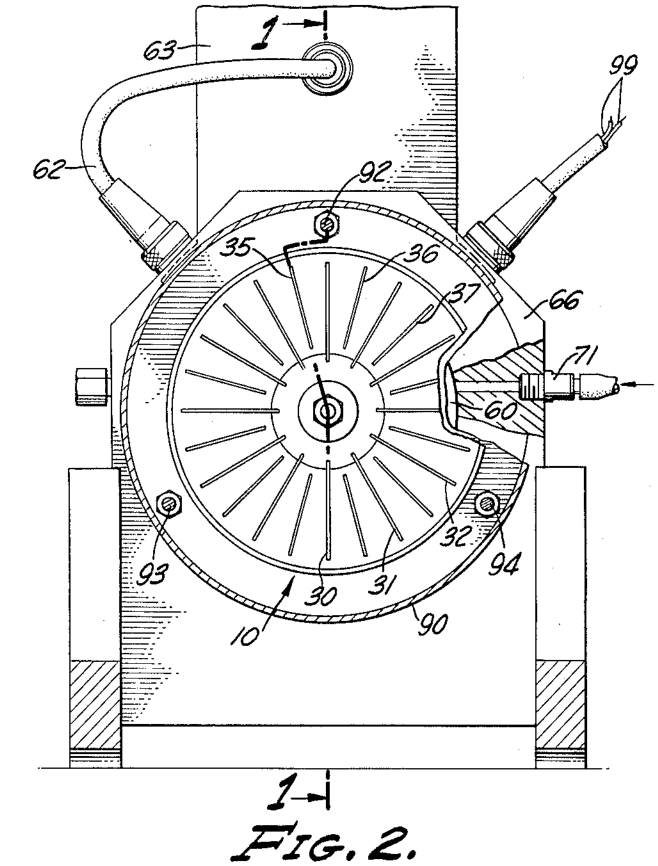
FIGURE 2 is a vertical cross-section of the device shown in FIGURE 1, taken as shown by the arrows therein.

Now further considering the assembly of the illustrative embodiment of our invention, the rotor member 10 consists of a number of grounded bars, 30, 31, 32, etc., radially arranged as shown in FIGURES 1 and 2 and interspersed with a like number of charging bars, 35, 36, 37, likewise visible in the drawings. The grounded bars, 30, 31, 32, etc., are in electrical contact with the frame of the entire assembly.

FIGURE 1 shows how one of the charging bars 35 is connected to the slip ring 60, which in turn is connected by brush 61 which is connected through connector 62 to a capacitor 63 of a suitable high voltage type and which may be one-half microfarad in capacitance. This capacitor is connected essentially as a filter capacitance, as is made clear by the schematic diagram in FIGURE 5. Any desired source of high voltage may be fed to filter capacitor 63 and thence to the charging bars 35, etc., as described; the source of the high voltage is indicated as 64 in FIGURE 5. In that figure, the ground 66 corresponds to the frame of the assembly.

It is clear that capacitor 63 acts as a conventional low-pass filter capacitor, and is connected across the supply voltage, that is, from the high side 64 of the latter to the common ground 66.

The grounded bars 30, etc., make contact with the hub of the rotor, which is in electrical and mechanical contact with the shaft of the motor 70, and thus are grounded to the frame 66. In order to insure positive electrical contact between the motor shaft and the frame, we prefer to provide a grounding brush 67, at the far end of the motor shaft.

We have found that for an apparatus having the dimensions and scale already indicated in the descriptions and drawings, a ¼ H.P. 10,000 r.p.m. motor 70 suffices to drive the device at a good workable speed, which may be anywhere between 3000 and 10,000 r.p.m.

It will be seen that if a suitable supply voltage, such as 1000 volts, is applied to the charging bars, with the motor in operation, then the charging bars will charge up the spring steel capacitor strips 43, 44, etc., as they are traversed by the charging bar in question. The rotor is adjusted so that it barely clears the face of the stator; we have found that a clearance of between 0.004 inch and 0.010 inch is satisfactory, and allows prompt charging across a minute gap and yet with no problems of ablation of the contact faces from arcing. In this preferred mode of operation we keep the interior of the apparatus flooded with an inert gas such as nitrogen or argon which is admitted to the gas inlet 71. As the charging bars sweep past the capacitors and charge them up in the manner described, they are followed a minute fraction of a second later by the grounded bars 30, 31, etc., which discharge the previously charged capacitors. With a device such as has been described operating under the named conditions, there can be as many as twenty million individual charges and discharges per second. Variation in the charge and discharge pattern and characteristic of individual capacitors is introduced by several factors contributed by the design of our apparatus. The assembly of the capacitor strips has some randomness in dimensions to begin with, and when the spring is coiled into a spiral, this introduces additional random variations, in that the environment of each individual capacitor strip is not quite the same as those of its neighbors. The overall result, even though we use the simplification of employing spring steel strips 43, 44, etc., all having the same width and thickness, is that we get a remarkably uniform white noise over a broad frequency range from 0 to at least 1000 megacycles per second. The output of all of the capacitors in parallel appears at the metal disc 50, which is led to the output terminal of the apparatus 80 through a narrow rod 81. We prefer to provide a resistor of approximately 50 ohms resistance in shunt across the output, as shown in FIGURE 5. This resistor 85 we prefer to give the physical form of a semi-conductor disc as shown in FIGURE 1. This disc which may be of a graphitic ceramic composition as commonly used in small fixed "carbon" resistors, makes contact with the output rod 81 by means of a hub assembly 82, and is grounded to the frame 66 of the device by clamp rings 83 and 84 which clamp and ground the entire periphery of the resistor disc 85.

The resistor disc 85, as may be seen from its configuration, has a quite minimal self-inductance as well as self-capacitance, and hence does not degrade the noise signal available at the output. The disc may be easily removed for high impedance direct feed to a broadband antenna.

In order to protect the mechanical and the electrical parts of the noise generator, and to facilitate maintaining the inert gas atmosphere described, we prefer to employ a housing 90 which is sealed against the motor frame 66 with an O-ring 91. The stator assembly together with the resistor and the support for the output terminal is all secured to frame 66 by bolts 92, 93 and 94. O-rings 96, where the housing meets the output terminal assembly, and 97 between motor housing 98 and frame 66, complete the necessary seals. The motor 70 is supplied with suitable electric current through input leads 99.

The supply voltage 64 we prefer to be D.C.; but we may in many cases equally well use A.C. If the latter is 60 c.p.s. or 400 c.p.s., for example, as commonly available, this frequency is nearly always far below any component of interest in the noise measurement concerned. In the discussion which follows, the numerical values for voltage are to be understood as peak voltages if A.C. is used.

For any given separation between the charging-shorting bar faces and the faces of the capacitor elements, it will be found that there is an optimum range for the supply voltage applied to the apparatus, and indeed this range varies slightly with the choice of inert gas. The lower limit of the optimum range is set by the inability of the charging and discharging voltages to bridge all of the gaps all of the time and by expansion due to heat dissipation; and the upper limit is set by the tendency for corona and arcing on the rotor to set in. For the preferred gap range already set forth hereinabove, and for argon or nitrogen as the inert gas, the lower limit of the optimum supply voltage range will be in the neighborhood of 500 to 600 volts, while the upper limit of the optimum range will be in the neighborhood of 900 to 1,000 volts. The noise generator is of course operable on both sides of these limits but suffers from lack of flatness in the output over the wide frequency range desired.

Some test results on our noise generator operated under different conditions will now be given.

The output testing of the noise generator was carried out in a test facility comprising a double solid shielded enclosure. The output was determined over four different ranges, using four different RI–FI meters, manufactured by Stoddard Aircraft Radio Company. The meters had all been calibrated at the factory, and no adjustment was made in the recorded values for difference at overlap. Table 1 hereinbelow gives the values of r.p.m. and voltage and indicates the nature of the inert gas, for each of the three tests. Table 2 shows the measured field intensity in decibels per microvolt at each of several frequencies within the range of each of the four meters used. The four ranges are separated by spaces in Table 2. It will be seen that within the test range of each meter, remarkably uniform response is obtained, especially considering the comparable output of noise generators previously known.

*Table 1*

| Test | Gas | R.p.m. | D.C. Voltage |
|---|---|---|---|
| A | Argon | 5,000 | 700 |
| B | Nitrogen | 5,000 | 800 |
| C | Argon | 10,000 | 800 |

*Table 2*

| | Test A | Test B | Test C |
|---|---|---|---|
| Frequency, kc.: | | | |
| 15 | 80 | 65 | 81 |
| 20 | 80 | 67 | 81 |
| 30 | 80 | ------ | 80 |
| 40 | 83 | 67 | 83 |
| 60 | 83 | 67 | 85 |
| 80 | 81 | 65 | 83 |
| 100 | 83 | 65 | 83 |
| 120 | 82 | ------ | 84 |
| 150 | 82 | 66 | 83 |
| 150 | 94 | 71 | 90 |
| 200 | 95 | 73 | 94 |
| 400 | 95 | 73 | 96 |
| 600 | ------ | 75 | 97 |
| 800 | 96 | 75 | 97 |
| 1,000 | ------ | 75 | 97 |
| 1,500 | 94 | ------ | 97 |
| 2,000 | 95 | 76 | 97 |
| 4,000 | 92 | 74 | 95 |
| 6,000 | ------ | 74 | 94 |
| 8,000 | 90 | 76 | 94 |
| 10,000 | 89 | ------ | 92 |
| 15,000 | 87 | 74 | 90 |
| 20,000 | 88 | 73 | 89 |
| 25,000 | 89 | 75 | 90 |
| Frequency, mc.: | | | |
| 30 | 78 | 75 | 68 |
| 40 | 76 | 67 | 75 |
| 60 | 76 | 70 | 66 |
| 80 | 74 | 68 | 65 |
| 120 | 74 | 67 | 72 |
| 160 | ------ | 65 | ------ |
| 200 | 63 | 55 | 62 |
| 240 | 58 | ------ | 55 |
| 250 | ------ | 47 | ------ |
| 300 | 47 | 40 | 44 |
| 350 | 52 | ------ | 49 |
| 400 | 52 | 47 | 60 |
| 400 | 59 | 55 | 66 |
| 500 | 61 | 51 | 67 |
| 600 | 58 | 49 | 64 |
| 700 | 55 | 44 | 62 |
| 800 | 51 | 42 | 57 |
| 900 | 50 | ------ | ------ |
| 1,000 | 48 | 38 | 53 |

It will be evident that while we have described our noise generator with the aid of a specific embodiment shown in the figures, and while we have described various specific materials, operating conditions, configurations, and the like, which we may employ, we do not mean to be limited by the particular details disclosed, since the invention is a broad one and accordingly, numerous variations are contemplated within the broad scope of the invention, as defined by the claims which follow.

What is claimed is:

1. An electrical noise generator comprising, in combination:

a supply voltage source;

a pair of axially aligned, juxtaposed disks in stator-rotor relationship;

a motor driving said rotor disk;

one of said disks presenting a flat face to the other of said disks comprising a multiplicity of electrically conductive bars in a radial disposition, every other one of which bars is grounded, and the alternate ones of which are connected to said supply voltage source;

said other disk having two faces and comprising a multiplicity of capacitor elements having exposed ends co-planar with the juxtaposed face of said disk, said pair of disks being juxtaposed sufficiently close for said supply voltage to bridge from said bars to said capacitor elements;

and a common capacitor base forming a common ground to said capacitor elements and connected on the other face of said other disk to a common output terminal.

2. The generator in accordance with claim 1 in which said supply voltage is within the range of about 500 to about 1000 volts D.C.

3. An electrical noise generator comprising, in combination:

a supply voltage source;

a pair of axially aligned, juxtaposed disks in stator-rotor relationship;

a motor driving said rotor disks;

one of said disks presenting a flat face to the other of said disks comprising a multiplicity of electrically conductive bars in a radial disposition, every other one of which bars is grounded, and the alternate ones of which are connected to said supply voltage source;

said other disk having two faces and comprising a multiplicity of capacitor elements having exposed ends co-planar with the juxtaposed face of said disk, said pair of disks being juxtaposed sufficiently close for said supply voltage to bridge from said bars to said capacitor elements;

a common capacitor base forming a common ground to said capacitor elements and connected on the other face of said other disk to a common output terminal;

and a shunting resistor in disk form between said common output and said frame.

4. The generator in accordance with claim 3 in which said supply voltage is within the range of about 500 to about 1000 volts D.C.

5. An electrical noise generator comprising, in combination:

a supply voltage source;

a pair of axially aligned, juxtaposed disks in stator-rotor relationship;

a motor driving said rotor disk;

one of said disks presenting a flat face to the other of said disks comprising a multiplicity of electrically conductive bars in a radial disposition, every other one of which bars is grounded, and the alternate ones of which are connected to said supply voltage source;

said other disk having two faces and comprising a multiplicity of capacitor elements having exposed ends co-planar with the juxtaposed face of said disk, said pair of disks being juxtaposed sufficiently close for said supply voltage to bridge from said bars to said capacitor elements;

and a common capacitor base in sheet metal form insulatingly entwined among said capacitor elements and forming a common ground thereto and connected on the other face of said other disk to a common output terminal.

6. The generator in accordance with claim 5 in which said supply voltage is within the range of about 500 to about 1000 volts D.C.

7. An electrical noise generator comprising, in combination:

a supply voltage source;

a pair of axially aligned, juxtaposed disks in stator-rotor relationship;

a motor driving said rotor disk;

one of said disks presenting a flat face to the other of said disks comprising a multiplicity of electrically conductive bars in a radial disposition, every other one of which bars is grounded, and the alternate ones of which are connected to said supply voltage source;

said other disk having two faces and comprising a multiplicity of capacitor elements having exposed ends co-planar with the juxtaposed face of said disk, said pair of disks being juxatposed sufficiently close for said supply voltage to bridge from said bars to said capacitor elements;

a common capacitor base in sheet metal form insulatingly entwined among said capacitor elements and forming a common ground thereto and connected on the other face of said other disk to a common output terminal;

and a shunting resistor in disk form between said common output and said frame.

8. The generator in accordance with claim 7 in which said supply voltage is within the range of about 500 to about 1000 volts D.C.

References Cited by the Examiner

UNITED STATES PATENTS 2,791,684 5/1957 Newman ............ 331—78

ROY LAKE, *Primary Examiner.*